Figure 1:
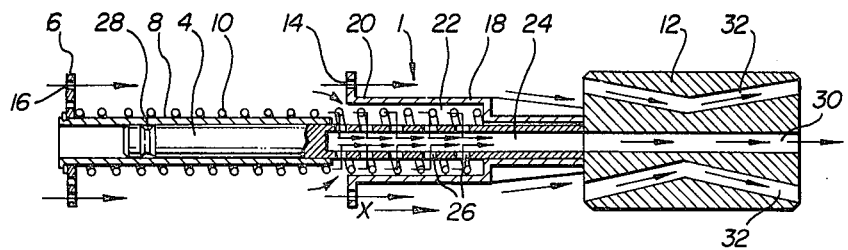

United States Patent [19]

Isaac

[11] 4,229,255
[45] Oct. 21, 1980

[54] METHOD AND APPARATUS FOR POSITIONING AND EJECTING FUEL ELEMENT BUNDLES IN AND FROM A DOWNSTREAM END OF A HORIZONTALLY EXTENDING FUEL CHANNEL

[75] Inventor: Peter Isaac, Mississauga, Canada

[73] Assignee: Atomic Energy of Canada Limited, Ottawa, Canada

[21] Appl. No.: 917,345

[22] Filed: Jun. 20, 1978

[30] Foreign Application Priority Data

Jul. 11, 1977 [CA] Canada ............................... 282410

[51] Int. Cl.$^2$ ............................................. G21C 19/22
[52] U.S. Cl. ......................................... 176/31; 176/30; 414/146
[58] Field of Search ........................... 176/30, 31, 32; 414/146

[56] References Cited

U.S. PATENT DOCUMENTS

| | | | |
|---|---|---|---|
| 3,567,576 | 3/1971 | Isaac | 176/32 |
| 3,597,317 | 8/1971 | Isaac | 414/146 |
| 3,756,914 | 9/1973 | Whittaker | 176/32 |
| 3,956,062 | 5/1976 | Smith | 414/146 |
| 3,958,699 | 5/1976 | Medlin | 176/32 |

*Primary Examiner*—David H. Brown
*Assistant Examiner*—Donald P. Walsh
*Attorney, Agent, or Firm*—F. W. Lemon

[57] ABSTRACT

A fuel bundle positioning and ejecting apparatus comprising two piston members, one slidable along a stem on the other piston member, and a compression spring urging the pistons apart, is secured in a horizontally extending fuel channel upstream of the coolant flow therealong. The downstream one of the piston members has a shield plug attached thereto and the piston members are urged together in a fuel channel with he compression spring compressed, by a series of fuel element bundles along the fuel channel. When the downstream end of the fuel channel is opened using a fuelling machine, with pressurized coolant therein and continued circulation of coolant along the fuel channel, the compression spring expands causing the piston members to become entrained in the coolant and urge the fuel element bundles out of the fuel channel and into the fuelling machine. The positioning and ejecting device avoids the trailing fuel element bundle from becoming trapped in a downstream end of the fuel channel through which there is no coolant flow. The apparatus includes variable flow restriction means to prevent the flow in the channel from increasing beyond acceptable limits to the fuel since the flow inherently tends to increase as fuel bundles are being removed and the flow resistance in the channel is reduced.

6 Claims, 24 Drawing Figures

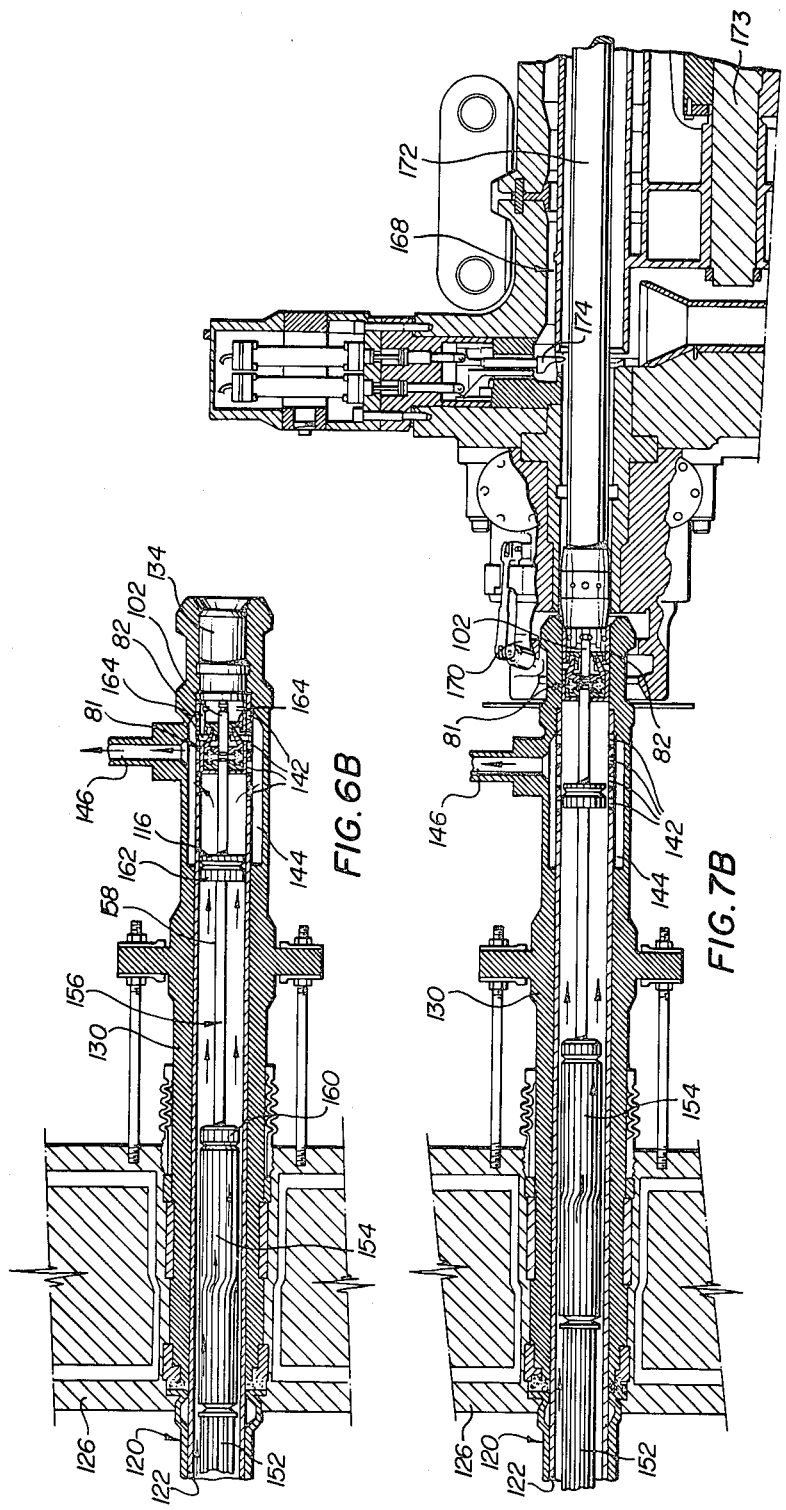

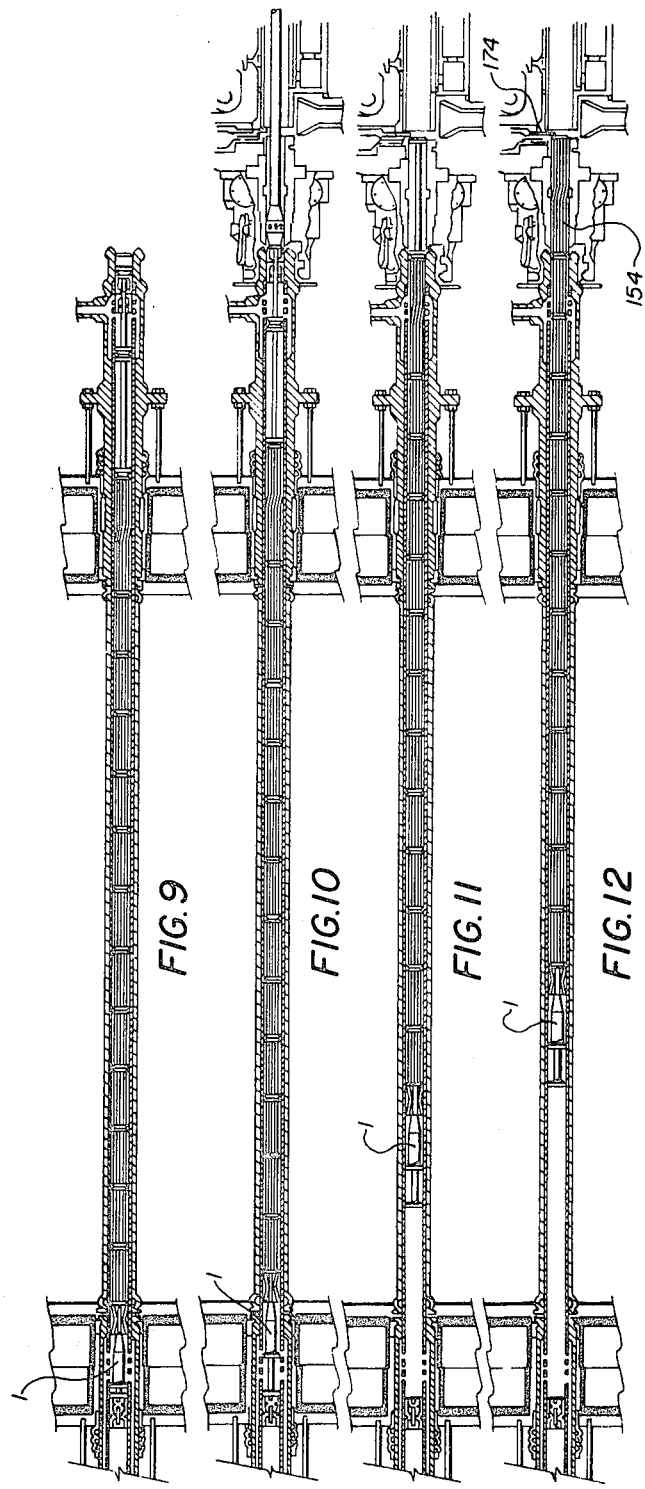

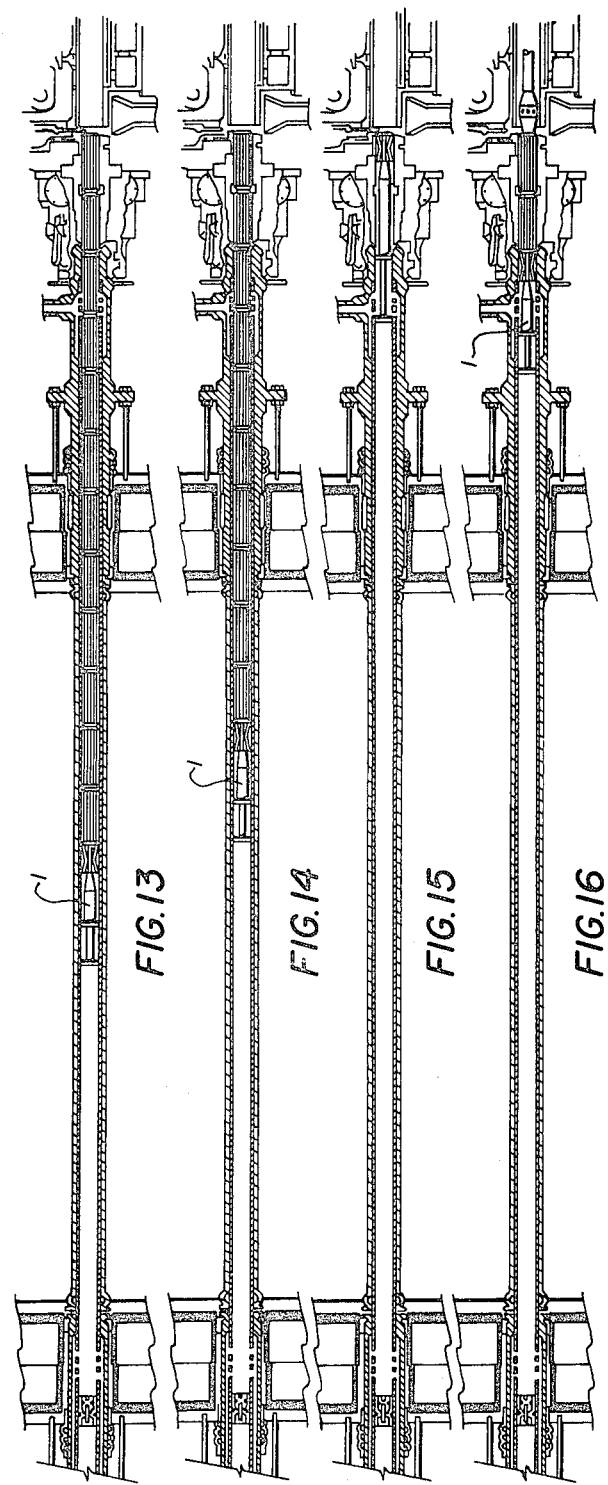

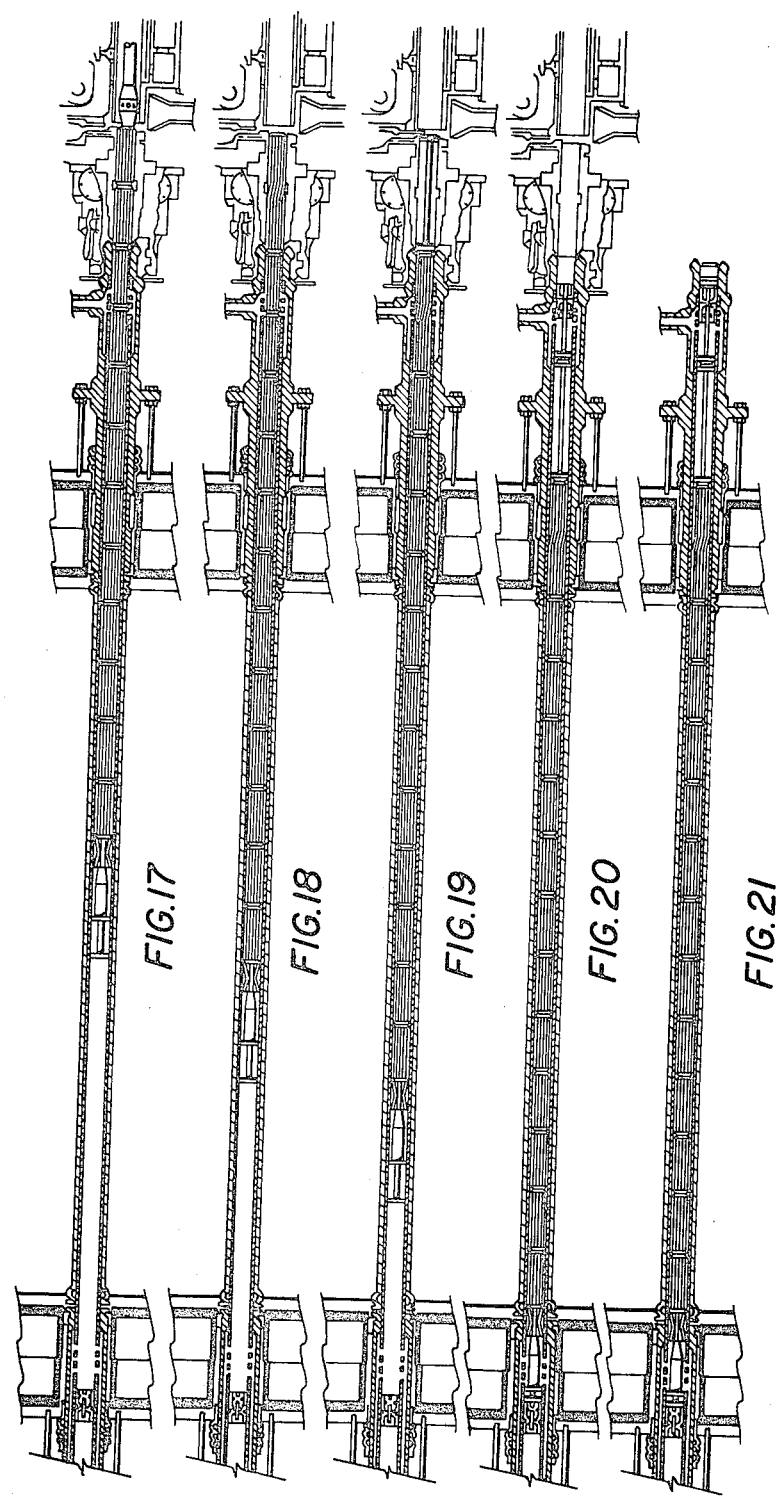

METHOD AND APPARATUS FOR POSITIONING AND EJECTING FUEL ELEMENT BUNDLES IN AND FROM A DOWNSTREAM END OF A HORIZONTALLY EXTENDING FUEL CHANNEL

This invention relates to a method and apparatus for positioning and ejecting fuel element bundles in and from a horizontally extending nuclear fuel channel using pressurized coolant flow entrainment to eject the fuel bundles beyond the coolant flow.

In U.S. Pat. No. 3,756,914, S. J. Whittaker dated Sept. 4, 1973, there is described a method and apparatus for fuelling a nuclear reactor, having horizontally extending fuel channels, from one end of the fuel channel tube, wherein a spent fuel stringer is replaced in a fuel channel tube downstream of the coolant flow. While the method and apparatus described by S. J. Whittaker is very useful for removing a spent fuel stringer, i.e. a series of attached nuclear fuel bundles, a problem still exists with moving a series of unattached nuclear fuel bundles from a fuel channel tube by coolant flow therealong because at least a last one of the trailing nuclear fuel bundles may become trapped in stagnant coolant in a portion of the fuel channel tube between a coolant outlet and the fuelling machine.

It is an object of the present invention to provide a method and apparatus for positioning and ejecting an unattached fuel bundle assembly in and from a horizontally extending nuclear fuel channel using pressurized coolant flow entrainment to eject the fuel bundles beyond the coolant flow and wherein the last trailing nuclear fuel bundle or bundles do not become trapped in stagnant coolant in a portion of the fuel channel tube between a coolant outlet and the fuelling machine.

According to the present invention there is provided a nuclear fuel bundle assembly positioning and ejecting apparatus using pressurized coolant flow entrainment to eject fuel bundles from a downstream end of a horizontally extending fuel channel, beyond the coolant flow therein, comprising:

(a) a first piston member slidable along the bore of the fuel channel, (b) a stem integral with the first piston member and extending therefrom in a sliding direction thereof, (c) a second piston member slidable along the bore of the fuel channel and slidably located on the stem, (d) a compression spring between the first and second piston members for compression therebetween, and whereby (e) with the positioning and ejecting apparatus in a portion of the fuel channel which is upstream of pressurized coolant flow therethrough, and with the compression spring held compressed at the upstream end by the fuel channel and at the downstream end by a series of fuel bundles, in a shielded portion of the fuel channel, opening the downstream end of the fuel channel with a fuelling machine connected thereto will cause the compression spring to move the piston members apart and the positioning and ejecting apparatus will become entrained in the coolant flow and eject the fuel bundles from the downstream end of the fuel channel into the fuelling machine.

Further according to the present invention there is provided a method of positioning and ejecting nuclear fuel bundles in and from a horizontally extending nuclear fuel channel using pressurized coolant flow entrainment to eject the fuel bundles beyond the downstream end of the coolant flow therein, wherein:

(a) the fuel channel is loaded with a series of fuel element bundles, a downstream shield plug and a positioning and ejecting apparatus in the upstream end of the fuel channel, the positioning and ejecting device comprising:

(i) a first piston and shielding member slidable along the bore of the fuel channel, (ii) a stem integral with the first piston member and extending therefrom in a sliding direction thereof, (iii) a second piston member slidable along the bore of the fuel channel and slidably located on the stem, (iv) a compression spring between the first and second piston members for compression therebetween, and (b) an upstream one of the piston members of the positioning and ejecting apparatus is engaged with the fuel channel to locate the ejecting device in a portion of the fuel channel, which is upstream of pressurized coolant flow therethrough, and then urging the first piston member upstream by means of the series of fuel element bundles so that the compression spring is compressed between the first and second piston members with the series of fuel bundles located in a shielded portion of the fuel channel and held therein by the downstream shield plug and a closure plug which is secured to the downstream end of the fuel channel, whereby (c) the fuel element bundles may be ejected from the fuel channel by removing the closure plug from the downstream end of the fuel channel with a fuelling machine attached thereto and pressurized coolant circulating through the fuel channel, so that;

(d) the compression spring of the loading and ejecting apparatus moves the piston members apart and entrains the positioning and ejecting apparatus in the coolant flow, and (e) the entrainment of the positioning and ejecting apparatus in the coolant flow causes the downstream shield plug and the fuel element bundles to be ejected from the downstream end of the fuel channel into the fuelling machine.

Further, according to the present invention there is provided a method of positioning and ejecting nuclear fuel bundles in and from a horizontally extending nuclear fuel channel using pressurized coolant flow entrainment to eject the fuel bundles beyond the downstream end of the coolant flow therein, wherein:

(a) the fuel channel is loaded with a series of fuel element bundles, a downstream shield plug and a positioning and ejecting apparatus in the upstream end of the fuel channel, the positioning and ejecting device comprising:

(i) a first piston member slidable along the bore of the fuel channel, (ii) a stem integral with the first piston member and extending therefrom in a sliding direction thereof, (iii) a second piston member slidable along the bore of the fuel channel and slidably located on the stem, (iv) a compression spring between the first and second piston members for compression therebetween, and (v) a shield plug having shielded coolant passages therethrough and slidable along the bore of the fuel channel, for location at the downstream end of the first and second piston members, and (b) an upstream one of the piston members of the positioning and ejecting apparatus is engaged with the fuel channel to locate the ejecting device in a portion of the fuel channel, which is upstream of pressurized coolant flow therethrough and then by urging the shield plug upstream by means of the series of fuel element bundles so that the compression spring is compressed between the first and second piston members, the series of fuel bundles are located in a shielded portion of the fuel channel and are held therein by the downstream shield plug and a closure plug which is secured to the downstream end of the fuel channel, whereby (c) the fuel element bundles may be ejected from the fuel channel by removing the closure plug from the downstream end of the fuel channel with a fuelling machine attached thereto and pressurized coolant circulating through the fuel channel so that, (d) the compression spring of the positioning and ejecting apparatus moves the piston members apart and entrains the loading and ejecting apparatus in the coolant flow, and (e) the entrainment of the loading and ejecting apparatus in the coolant flow causes the downstream shield plug and the fuel element bundles to be ejected from the downstream end of the fuel channel into the fuelling machine.

Figure 2:
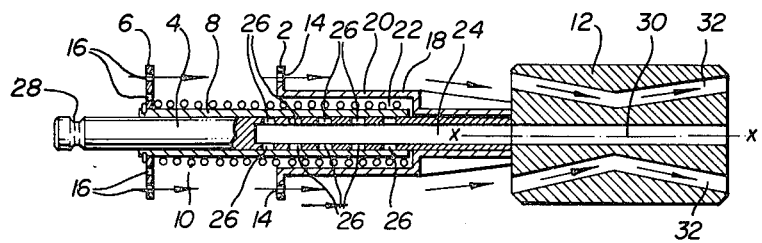
Figure 3:
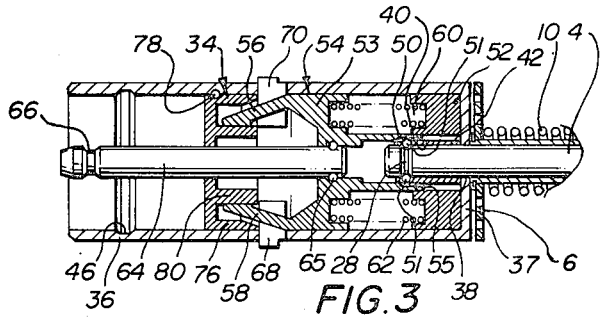
Figure 4:
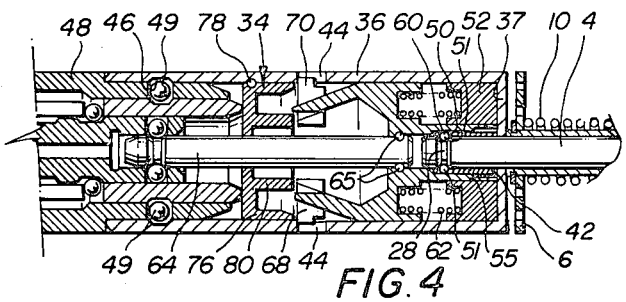
Figure 5:
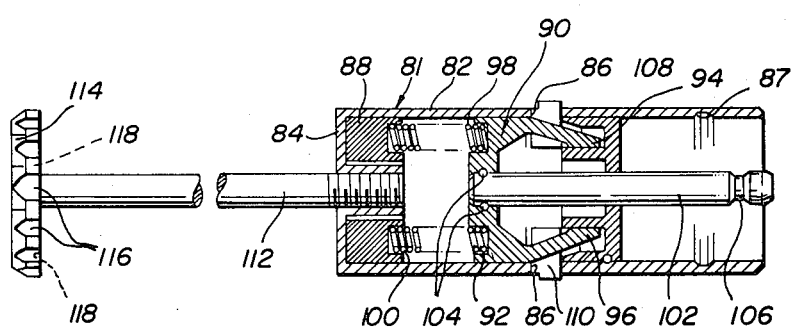
Figure 6A:
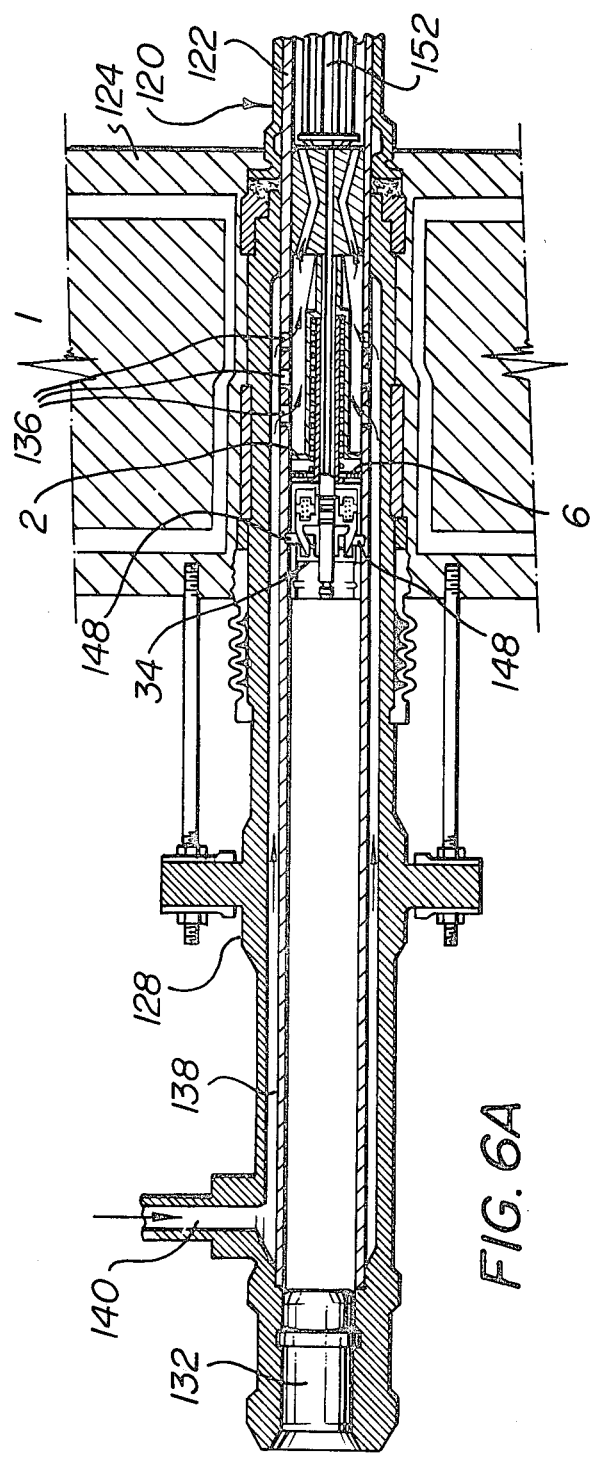
Figure 7A:
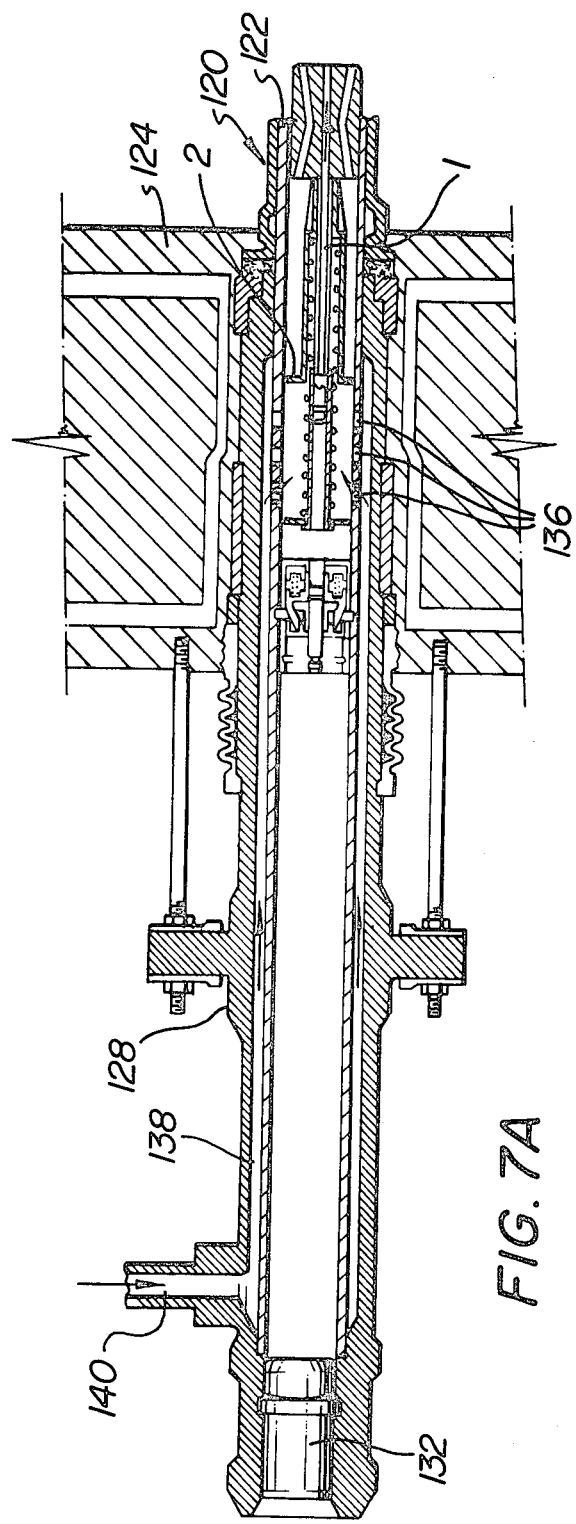
Figure 8A:
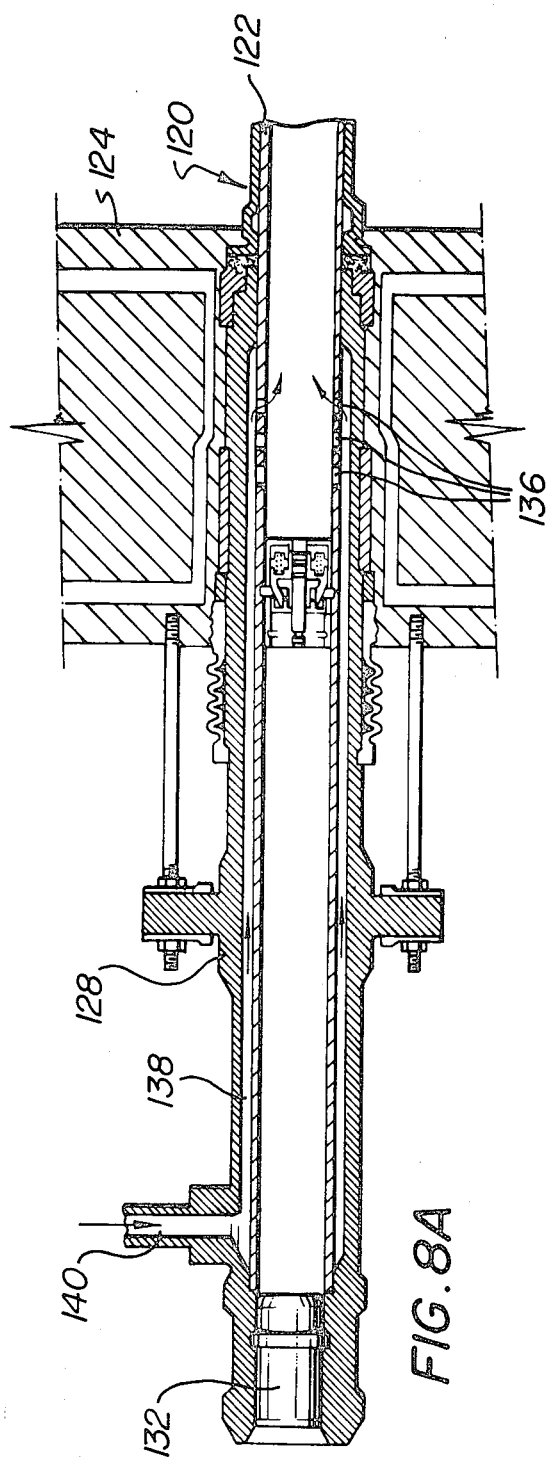
Figure 8B:
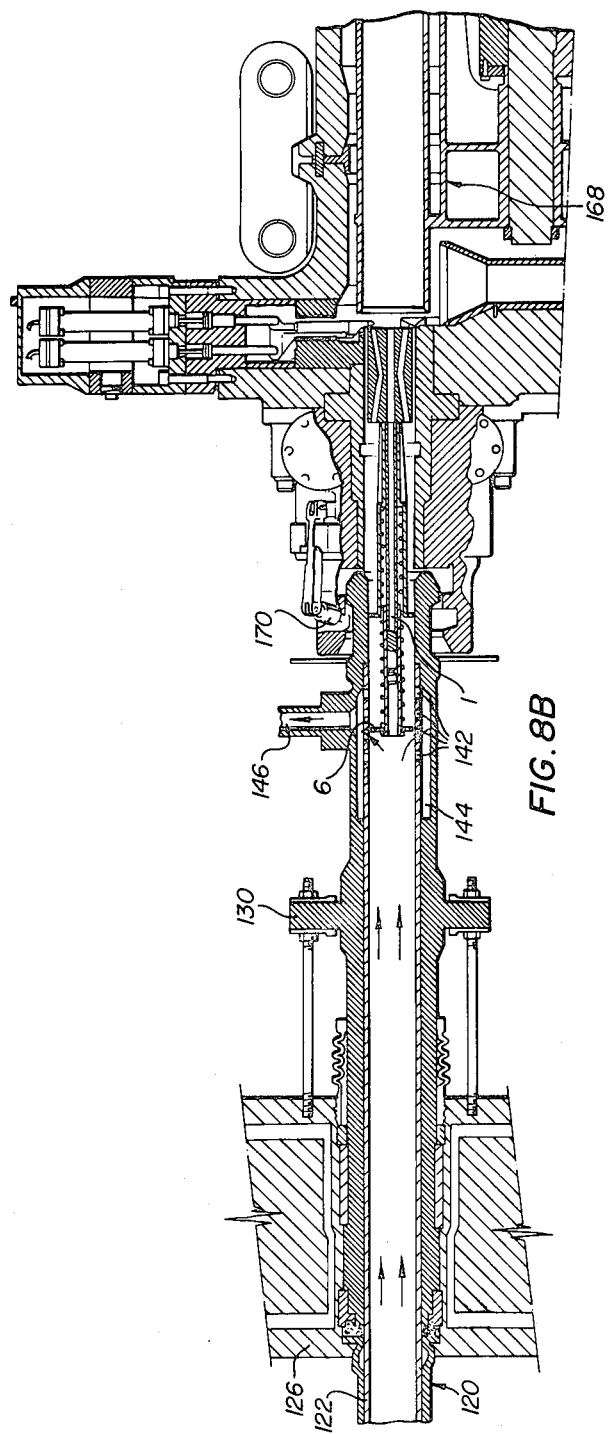

In the accompanying drawings which illustrate, by way of example, an embodiment of the present invention, FIG. 1 is a partly sectioned side view of a nuclear fuel bundle positioning and ejecting apparatus, in the uncompressed state, using pressurized coolant flow entrainment to eject fuel bundles from a horizontally extending fuel channel, beyond the coolant flow therein, FIG. 2 is a similar view to that shown in FIG. 1 but with the apparatus in the compressed state, FIG. 3 is a partly sectioned side view of a latching mechanism for the apparatus shown in FIGS. 1 and 2, but unlatched therefrom, FIG. 4 is a similar view to FIG. 3 but with the latching mechanism latched to the apparatus shown in FIG. 2, by a ram from an upstream fuelling machine, FIG. 5 is a partly sectioned side view of a downstream latching mechanism for the apparatus shown in FIGS. 1 and 2, FIGS. 6a and 6b are partly sectioned side views of the upstream and downstream ends respectively of a loaded fuel channel with a nuclear fuel bundle ejecting apparatus comprising the apparatus shown in FIGS. 1 to 5, together with a retaining plug in the downstream end of the fuel channel and a closure plug at each thereof, FIGS. 7a and 7b are similar views to those shown in FIGS. 6a and 6b but with a fuelling machine attached to the downstream end of the fuel channel which is in process of being unloaded, FIGS. 8a and 8b are similar views to those shown in FIGS. 6a and 6b but with the fuel channel unloaded, and FIGS. 9 to 21 are sectional side views showing the unloading and loading of a fuel channel assembly using the apparatus shown in FIGS. 1 to 6a and 6b.

Referring now to FIGS. 1 and 2, there is shown a nuclear fuel bundle assembly positioning and ejecting apparatus, generally designated 1, which as will be described later uses pressurized coolant flow entrainment to eject fuel bundles (not shown) from a horizontally extending fuel channel (not shown), beyond the coolant flow therein, comprising:

(a) a first piston member 2 slidable along the bore of the fuel channel, (b) a stem 4 integral with the first piston member 2 and extending therefrom in a sliding direction X thereof, (c) a second piston member 6 slidable along the bore of the fuel channel and slidably located on the stem 4 in this embodiment by means of a sleeve 8 integral with the second piston member 6, (d) an ejecting compression spring 10 urging the first and second piston members 2 and 6 apart and for compression therebetween as shown in FIG. 2, and (e) a shield plug 12 having shielded coolant passages 28 therethrough and slidable along the bore of the fuel channel, for location at the downstream end of the first and second piston members 2 and 6, whereby, as will be described later, (f) with the positioning and ejecting apparatus 1 in a portion of the closed fuel channel which is upstream of pressurized coolant flow therethrough, and with the compression spring 10 compressed as shown in FIG. 2 as will be described later by the fuel channel and a series of fuel bundles, in a shielded portion of the fuel channel, opening the downstream end of the fuel channel with a fuelling machine connected thereto will cause the compression spring 10 to move the piston members 2 and 6 apart as shown in FIG. 1 and the loading and ejecting apparatus 1 will become entrained in the coolant flow and eject the fuel bundles from the downstream end of the fuel channel into the fuelling machine.

The first and second piston members 2 and 6 have coolant passages 14 and 16 respectively extending through them.

The stem 4 is integral with the first piston member 2 by being attached to the shield plug 12, to which the first piston member 2 is attached by a sleeve 18. The sleeve 18 has a portion 20 having enlarged bore 22 for the reception of an end portion of the compression spring 10.

The stem 4 has a blind bore 24 extending along a tubular extension from the downstream end thereof to a series of coolant inlet ports 26 extending through the wall of the stem 4 to the blind bore 24. The coolant inlet ports 26 are covered by the sleeve 8 when the first and second piston members 2 and 6 are moved together as shown in FIG. 2 and uncovered when the first and second piston members are moved apart as shown in FIG. 1 to provide, as will be described later, a flow limiting device for the flow of coolant along a fuel channel as a series of fuel bundles are being removed therefrom.

The stem 4 has a latching mechanism engaging groove 28 around the upstream end.

The shield plug 12 has the shielded coolant passages provided therein in the form of a central coolant passage 30 extending therethrough from the blind bore 24 in the stem 4, and a plurality of shielded coolant passages around the central coolant passage 30, two of which are shown and designated 32. In this embodiment the longitudinally shielded coolant passages 32 are thus shielded by converging towards and then diverging away from the axis XX (FIG. 1) of symmetry of the shield plug 12.

In FIGS. 3 and 4 similar parts to those shown in FIGS. 1 and 2 are designated by the same reference numerals and the previous description is relied upon to describe them.

In FIGS. 3 and 4 there is shown an upstream latching mechanism generally designated 34 for locating the upstream end of the stem 4 and comprising:

(a) a cylindrical casing 36 having a downstream end wall 37 with a central opening 38, an inwardly extending tubular portion 42 integral with the end wall 37 with the central opening forming an entry to the bore 40 thereof, circumferentially spaced latching slots therearound, two of which are shown and designated 44, an internal latching ball engaging groove 46 upstream of the latching slots 44 and for engaging latching balls 49 of a fuelling machine ram mechanism 48, and a plurality of latching ball retaining holes 50 in an space around the tubular portion, (b) a latching ball 51 in each latching ball retaining hole 50 for engaging the latching ball engaging groove around the upstream end of the stem 4, (c) a compression spring retaining ring 52 in the casing 36 and next to the end wall 37 and around and radially spaced from the tubular portion 42, (d) a latch actuator 54 slidably retained in the casing 36 for movement towards and away from the upstream end of the retaining ring 52, the latch actuator comprising an annular shaped body portion 53 with a latching ball engaging sleeve 55, for urging the latching balls 51 radially inwardly, integral therewith and extending downstream around each latching ball 51 when the latch actuator 54 is moved towards the retaining ring 52 as shown in FIG. 3, and latch actuating fingers, two of which are shown and designated 56 and 58, integral with the annular-shaped body portion 53 and sloping radially inwardly from the upstream end thereof, (e) compression spring means, in the form of springs 60 and 62, extending between and for urging apart the retaining ring 52 and the latch actuator 54 for compression therebetween, (f) a fuelling machine ram mechanism engaging spindle 64 secured in the annular-shaped body portion 54 of the latch actuator 54 by pins 65 and extending upstream therefrom with a fuelling machine ram mechanism latch engaging groove 66 at the upstream end, and (g) fuel channel recess engaging latching segments, two of which are shown and designated 68 and 70, slidably secured by slots therein on the fingers 56 and 58 respectively for radial movement out of the latching slots 44 in the casing 36.

The main purpose of the upstream latching mechanism 34 is for the removal of the nuclear fuel bundle assembly positioning and ejecting apparatus 1 from the upstream end of the fuel channel.

In this embodiment a cup-shaped finger support 76 is secured by a pin 78 in the cylindrical casing 36 upstream of the fingers 56 and 58, and has a cylindrical inner extension 80 slidably supporting the fingers 56 and 58 against radially inward movement.

In FIG. 5 there is shown a downstream latching mechanism generally designated 81 for locating the downstream end of a fuel bundle assembly, comprising:

(a) a cylindrical casing 82 having an upstream end wall 84 with a central, screw threaded opening 38, circumferentially spaced latching slots therearound, two of which are shown and designated 86 and a circumferential latching ball engaging groove 87 downstream of the latching slots 86 and for engaging latching balls of a fuelling machine ram mechanism (not shown), (b) a compression spring retaining ring 88 in the casing 82 and next to the end wall 84 and coaxial with the central screw threaded opening 38, (c) a latch actuator 90 slidably retained in the casing 82, for movement towards and away from the downstream end of the retaining ring 88, the latch actuator 90 comprising an annular-shaped body portion 92 and latch actuating fingers, two of which are shown and designated 94 and 96, integral with the annular-shaped body portion 92 and sloping radially inwardly from the downstream end thereof, (d) compression spring means, in the form of springs 98 and 100, extending between and urging apart the retaining ring 88 and the latch actuator 90, (e) a fuelling machine ram mechanism engaging spindle 102 secured in the annular-shaped body portion 92 of the latch actuator 90 by pins 104 and extending downstream therefrom with a fuelling machine ram mechanism latch engaging groove 106 at the downstream end, and (f) fuel channel recess engaging latching segments, two of which are shown and designated 108 and 110, slidably secured by slots therein on the fingers 94 and 96 respectively for radial movement out of the latching slots 86 in the casing 82.

In this embodiment a spindle 112 is attached to, and extends upstream from, the retaining ring 88. The spindle 112 has a piston member 114 attached to the upstream end thereof. The piston member 114 has coolant flutes 116 and passages 118.

In FIGS. 6a to 8b similar parts to those shown in FIGS. 1 to 5 are designated by the same reference numerals and the previous description is relied upon to describe them.

In FIGS. 6a to 8b there is shown the end portions of a fuel channel generally designated 120. The fuel channel 120 is of a known type comprising a pressure tube 122 extending between and beyond end shields 124 and 126 of a nuclear reactor, end fittings 128 and 130 sealed over end portions of the pressure tube 122, and closure plugs 132 and 134 (shown in FIG. 6).

The pressure tube 122 has coolant inlet ports 136 and the end fitting 128 seals an annular coolant passage 138 around the upstream end of the pressure tube 122. The end fitting 128 has a coolant inlet 140 to the annular coolant passage 138 which in turn delivers coolant to the inlet ports 136.

The pressure tube 122 has outlet ports 142 and the end fitting 130 seals an annular coolant passage 144 around the downstream end of the pressure tube 122. The end fitting 130 has a coolant outlet 146 from the annular coolant passage 144 which receives coolant through the outlet ports 142.

When the fuel channel 120 is loaded as shown in FIGS. 6a and 6b the upstream latching mechanism 34 is in the position shown in FIG. 3, where it is unlatched from the apparatus shown in FIG. 1 and the latching segments 68 and 70 are latched into an annular groove 148 in the pressure tube 122 of the fuel channel 120 and the compression springs 60 and 62 uncompressed. The ejecting apparatus 1 is held in the compressed position shown in FIG. 2 by a series of fuel element bundles 152 arranged end-to-end along the pressure tube 122 of the fuel channel 120, between the end shields 124 and 126. A shield plug 154 of known type having shielded coolant passages therethrough and shielded coolant flow path flutes therealong is located in the portion of the pressure tube 122 of the fuel channel 120 extending through the downstream end shield 126 and is against the furthermost downstream fuel element bundle 152. A spacer plug 156 of known type is provided in the pressure tube 122 of the fuel channel 120 and comprises a spindle 158 with piston shaped end portions 160 and 162 at each end. The piston shaped end portions have coolant opening passages (not shown) and coolant flute passages. The downstream latching mechanism 81 has the latching segments 108 and 110 thereof latched into an annular groove 164 in the pressure tube 122 of the fuel channel 120.

In FIGS. 9 to 21 similar parts to those shown in FIGS. 1 to 8b are designated by the same reference numerals and the previous description is relied upon to describe them.

In operation, with the apparatus as shown in FIGS. 6 and 9 coolant flows in the inlet 140, along the passage 138, through the inlet ports 136, along the pressure tube 122, through the outlet ports 142, along the passage 144 and out through the outlet 146. The latching mechanism 81, together with the spacer plug 156, holds the shield plug 154, fuel element bundles 152 and ejecting apparatus 1 in position in the pressure tube 122 against the latching mechanism 34 so that coolant flow along the pressure tube 12 and the force of the compression spring 10 (FIG. 2) do not move these members in a downstream direction. It will be noted that at this stage the first piston member 2 is upstream of the inlet ports 136 so that no pumping penalty is incurred in the flow of coolant, through the fuel channel, by the first and second piston members 2 and 6.

When it is necessary to remove the fuel element bundles 152 from the pressure tube 122 a fuelling machine 168 (FIGS. 7a to 8b) of known type is clamped by a fuelling machine head 170 thereof to the downstream end of the fuel channel 120 as shown in FIGS. 7a and 7b. The fuelling machine 168 is pressurized with coolant to the coolant pressure in the fuel channel 120 and then with coolant flowing along the fuel channel 120, the closure plug 134 is disconnected from the fuel channel 120, by a ram mechanism 172 (FIGS. 7a and 7b) and stored in the fuelling machine in a known manner (not shown).

The ram mechanism 172 then returns and is latched on to the spindle 102 and the casing 82 of the latching mechanism 81. The spindle 102 is then pushed by the ram mechanism 172 while the casing 82 is held stationary thereby so that the compression springs are compressed by movement of the latch actuator 90 towards the retaining ring 88. This movement of the latch actuator 90 causes the fingers 94 and 96 (FIG. 5) to move the latching segments, such as those designated 118 and 110, radially inwardly and disengage them from the annular groove 164 in the pressure tube 122 (FIGS. 6a and 6b). As shown in FIG. 10 the ram mechanism 172 then draws the latching mechanism 81 into the fuelling machine 168 for storage therein in a magazine 173 which is rotatable.

When the ram mechanism 172 commences drawing the latching mechanism 81 into the fuelling machine 168 the compression spring 10 of the ejecting apparatus 1 expands from the position shown in FIG. 2 to the position shown in FIG. 1 so that the first piston member 2 is moved downstream from the position shown in FIGS. 6a and 6b to the position shown in FIGS. 7a, 7b and 10 where it is beyond the inlet ports 136. At this point one of the fuel element bundles 152 has commenced leaving the core of the nuclear reactor i.e., the portion of the pressure tube 122 between the end shields 124 and 126. As the compression spring 10 expands the sleeve 8 (FIGS. 1 and 2) progressively uncovers the ports 26 to allow coolant flow therethrough in addition to the flow through the ports 14 until the coolant flow balances the force of the compression spring 10. From then on any increase in coolant flow along the fuel channel 120 will compress the spring 10 and progressively close the ports 26 so that the coolant flow along the fuel channel 120 is limited to the flow that the fuel element bundles 152 can withstand without being damaged.

The latching mechanism 81 is drawn into the fuelling machine 168 and is followed by the spacer plug 156 until a stop mechanism 174 in the fuelling machine 168 is actuated to engage the leading end of and arrest the motion of the spacer plug 156 as shown in FIG. 11. It should be noted at this stage that each time the stop mechanism 174 is used from how on to arrest movement of the contents of the fuel channel 120 into the fuelling machine 168, the magazine 173 thereof is rotated to position an empty compartment of the magazine 173 to receive some of the contents of the fuel channel 120 still to be emptied therefrom.

After the magazine 173 has been rotated the stop mechanism 174 is actuated to allow the spacer plug 156 to enter an empty compartment of the magazine 173 and the stop mechanism 174 is actuated to arrest the movement of the shield plug 154 as shown in FIG. 12.

Again the magazine 173 is rotated, this stop mechanism 174 is then actuated to allow the shield plug 154 to enter an empty compartment of the magazine, and the stop mechanism actuated to arrest the movement of the leading fuel element bundle 152 as shown in FIG. 13.

From now on the magazine 173 is alternately rotated and the stop mechanism 174 used to load each compartment in the magazine 173 with two fuel element bundles 152 as shown in FIG. 14 until all of the fuel element bundles 152 have been emptied from the fuel channel 120 and the stop mechanism 174 is arresting movement of the ejecting apparatus 1 as shown in FIGS. 8a, 8b and 15.

As the hardware and fuel are being removed from the fuel channel, as described above, the coolant flow along the fuel channel tends to increase due to the lowered resistance it encounters. The degree of increase is limited by the variable flow limiting means incorporated in apparatus 1. The increased flow encountered by piston 6 compresses the spring 10 thereby closing off some of flow passage 26. This increases the overall resistance of apparatus 1 and thereby limits the flow increase in the fuel channel.

At this stage the second piston member 6 (FIGS. 8a and 8b) is the only one that is still within the coolant flow and so is the only source for providing the force to urge the ejecting apparatus 1 for the last few inches of travel to the stop mechanism 174.

FIGS. 16 to 21 show how the ram 172 (FIGS. 7a and 7b) is used in conjunction with the stop mechanism 174 to reload the fuel channel 120 in a conventional manner until the fuel channel 120 is loaded again in the same manner as shown in FIG. 9.

It will be appreciated that in emergency situations a ram 48 (FIG. 4) of a fuelling machine similar or identical to the fuelling machine 168 can be coupled to the upstream end of the fuel channel 120 to remove the closure plug 132 and then the fuel channel contents from the upstream end. In this case unlatching of the upstream latching mechanism 34 by the ram 48 of the fuelling machine 168 causes the latching mechanism 34 to lock on to the spindle 4 of the ejecting apparatus 1 as shown shown in FIG. 4 so that the ejecting apparatus 1 may be removed by the ram 48 with the latching mechanism 34 and stored in the fuelling machine magazine. The fuel element bundles 152 are then removed from the fuel channel 120 in a conventional manner by a fuel element grappling process. It may also be desirable to empty outer fuel channels 120 in a reactor core in this manner, where the coolant flow along these outer fuel channels may not be sufficient to eject the fuel channel contents in the downstream direction and where the economic penalties incurred to increase the coolant flow sufficiently for this purpose are prohibitive.

In other, simplified, embodiments of the present invention the first piston member 2 is omitted and the shield plug 12 performs the function of the first piston member 2, and the compression spring 10 extends between the second piston member 6 and the shield plug 12. This in this embodiment the shield plug 12 is a first piston and shielding member and pictorially the apparatus may be the same as the apparatus shown in FIGS. 1 and 2 but without the piston 2.

In some nuclear reactors the flow limiting feature may not be necessary and so it is within the scope of the present invention to provide the apparatus shown in FIGS. 1 and 2, or the simplified version described above, without the flow limiting feature.

I claim:

1. A nuclear fuel bundle assembly positioning and ejecting apparatus using pressurized coolant flow entrainment to eject fuel bundles from a downstream end of a horizontally extending fuel channel, beyond the coolant flow therein, comprising:
    (a) a first piston member slidable along the bore of the fuel channel,
    (b) a stem integral with the first piston member and extending therefrom in a sliding direction thereof,
    (c) a second piston member slidable along the bore of the fuel channel and slidably located on the stem,
    (d) a compression spring between the first and second piston members for compression therebetween, and whereby,
    (e) with the positioning and ejecting apparatus in a portion of the fuel channel which is upstream of pressurized coolant flow therethrough, and with the compression spring held compressed at the upstream end by the fuel channel and at the downstream end by a series of fuel bundles, in a shielded portion of the fuel channel, opening the downstream end of the fuel channel with a fuelling machine connected thereto will cause the compression spring to move the piston members apart and the positioning and ejecting apparatus will become entrained in the coolant flow and eject the fuel bundles from the downstream end of the fuel channel into the fuelling machine.

2. An apparatus according to claim 1, which includes a shield plug, having shielded coolant passages therethrough and slidable along the bore of the fuel channel, for location at the downstream end of the first and second piston members, and wherein the shielded coolant passages in the shield plug comprise a central passage extending therethrough and a plurality of shielded coolant passages around the central coolant passage, a tubular extension is provided on the downstream end of the stem, the shield plug is integral with the tubular extension, the tubular extension has a blind bore leading to the central coolant passage of the shield plug, a series of coolant inlet ports extend through the wall of the tubular extension to the blind bore, a sleeve is provided which is integral with the second piston member and mounts the second piston member on the stem in a slidable manner to cover the coolant inlet ports when the compression spring is compressed and uncover them when the compression spring is expanded.

3. An apparatus according to claim 1, which includes an upstream latching mechanism for locating the upstream end of the stem, comprising:
    (a) a cylindrical casing having a downstream end wall with a central opening, an inwardly extending tubular portion integral with the end wall with the central opening forming an entry to the bore thereof, circumferentially spaced latching slots, therearound, an internal, circumferential latching ball engaging groove upstream of the latching slots and for engaging latching balls of a fuelling machine ram mechanism, and a plurality of latching ball retaining holes in a space around the tubular portion,
    (b) a latching ball in each latching ball retaining hole, for engaging a latching ball engaging groove around the upstream end of the stem,
    (c) a compression spring retaining ring in the casing and next to the end wall and around and radially spaced from the tubular portion,
    (d) a latch actuator slidably retained in the casing for movement towards and away from the upstream end of the retaining ring, the latch actuator comprising an annular-shaped body portion with a latching ball engaging sleeve, for urging the latching balls radially inwardly, integral therewith and extending downstream around each latching ball when the latch actuator is moved towards the retaining ring, and latch actuating fingers integral with the annular-shaped body portion and sloping radially inwardly from the upstream end thereof,
    (e) compression spring means extending between and for urging apart the retaining ring and the latch actuator for compression therebetween,
    (f) a fuelling machine ram mechanism engaging spindle secured in the annular-shaped body portion of the latch actuator and extending upstream therefrom with a fuelling machine ram mechanism engaging groove at the upstream end, and
    (g) fuel channel recess engaging latching segments slidably secured by slots therein on the fingers for radial movement out of the latching slots in the casing.

4. An apparatus according to claim 1, which includes a downstream latching mechanism for locating the downstream end of the fuel bundle assembly, comprising:
    (a) a cylindrical casing having an upstream end wall with a central opening, circumferentially spaced latching slots therearound, and a circumferential latching ball engaging groove downstream of the latching slots and for engaging latching balls of a fuelling machine ram mechanism,
    (b) a compression spring retaining ring in the casing and next to the end wall and coaxial with the central opening,
    (c) a latch actuator slidably retained in the casing for movement towards and away from the downstream end of the retaining ring, the latch actuator comprising an annular-shaped body portion and latch actuating fingers integral with the annular-shaped body portion and sloping radially inwardly from the downstream end thereof,
    (d) compression spring means extending between and for urging apart the retaining ring and the latch actuator, (e) a fuelling machine ram mechanism engaging spindle secured in the annular-shaped body portion of the latch actuator and extending downstream therefrom with a fuelling machine ram mechanism engaging groove at the downstream end, and (f) fuel channel recess engaging latching segments slidably secured by slots therein on the fingers for radial movement out of the latching slots in the casing.

5. A method of positioning and ejecting nuclear fuel bundles in and from a horizontally extending nuclear fuel channel using pressurized coolant flow entrainment to eject the fuel bundles beyond the downstream end of the coolant flow therein, wherein:

(a) the fuel channel is loaded with a series of fuel element bundles, a downstream shield plug and a positioning and ejecting apparatus in the upstream end of the fuel channel, the positioning and ejecting device comprising:

(i) a first piston and shielding member slidable along the bore of the fuel channel, (ii) a stem integral with th first piston member and extending therefrom in a sliding direction thereof, (iii) a second piston member slidable along the bore of the fuel channel and slidably located on the stem, (iv) a compression spring between the first and second piston members for compression therebetween, and (b) an upstream one of the piston members of the positioning and ejecting apparatus is engaged with the fuel channel to locate the ejecting device in a portion of the fuel channel which is upstream of pressurized coolant flow therethrough, and then urging the first piston member upstream by means of the series of fuel element bundles so that the compression spring is compressed between the first and second piston members with the series of fuel bundles located in a shielded portion of the fuel channel and held therein by the downstream shield plug and a closure plug which is secured to the downstream end of the fuel channel, whereby (c) the fuel element bundles may be ejected from the fuel channel by removing the closure plug from the downstream end of the fuel channel with a fuelling machine attached thereto and pressurized coolant circulating through the fuel channel, so that;

(d) the compression spring of the positioning and ejecting apparatus moves the piston members apart and entrains the loading and ejecting apparatus in the coolant flow, and (e) the entrainment of the positioning and ejecting apparatus in the coolant flow causes the downstream shield plug and the fuel element bundles to be ejected from the downstream end of the fuel channel into the fuelling machine.

6. A method of positioning and ejecting nuclear fuel bundles in and from a horizontally extending nuclear fuel channel using pressurized coolant flow entrainment to eject the fuel bundles beyond the downstream end of the coolant flow therein, wherein:

(a) the fuel channel is loaded with a series of fuel element bundles, a downstream shield plug and a positioning and ejecting apparatus in the upstream end of the fuel channel, (b) an upstream one of the piston members of the positioning and ejecting apparatus is engaged with the fuel channel to locate the ejecting device in a portion of the fuel channel which is upstream of pressurized coolant flow therethrough, and then by urging the shield plug upstream by means of the series of fuel element bundles so that the compression spring is compressed between the first and second piston members, the series of fuel bundles are located in a shielded portion of the fuel channel and are held therein by the downstream shield plug and a closure plug which is secured to the downstream end of the fuel channel, whereby (c) the fuel element bundles may be ejected from the fuel channel by removing the closure plug from the downstream end of the fuel channel with a fuelling machine attached thereto and pressurized coolant circulating through the fuel channel, so that;

(d) the compression spring of the positioning and ejecting apparatus moves the piston members apart and entrains the loading positioning and ejecting apparatus in the coolant flow, and (e) the entrainment of the positioning and ejecting apparatus in the coolant flow causes the downstream shield plug and the fuel element bundles to be ejected from the downstream end of the fuel channel into the fuelling machine.

* * * * *